United States Patent [19]

Nemchek

[11] Patent Number: 4,661,971
[45] Date of Patent: Apr. 28, 1987

[54] DIGITAL SIGNAL CROSS-CONNECTION SYSTEM

[75] Inventor: George R. Nemchek, Norwood, N.J.

[73] Assignee: Bell Communications Research, Inc., Livingston, N.J.

[21] Appl. No.: 805,313

[22] Filed: Dec. 5, 1985

[51] Int. Cl.[4] .............................................. H04M 3/26
[52] U.S. Cl. ....................................... 379/29; 379/22
[58] Field of Search .......... 179/175.2 R, 175, 175.2 C, 179/175.3 R

[56] References Cited

U.S. PATENT DOCUMENTS

| | | | |
|---|---|---|---|
| 3,812,302 | 5/1974 | Herr ................................. | 179/175.2 |
| 3,919,503 | 11/1975 | Friedrichsen et al. ............ | 179/175.2 |
| 4,076,970 | 2/1978 | Lubarsky et al. .............. | 179/175.2 R |
| 4,185,174 | 1/1980 | Beyhurst et al. .................. | 179/175.2 |
| 4,533,914 | 8/1985 | Norling et al. .................. | 340/825.79 |

OTHER PUBLICATIONS

"Test Equipment for Siemens ESK 3000E Crosspoint PABXs" by E. Dotzauer et al, Reports on Telephone Engineering VII (1971) No. 4, pp. 128-135.
"No. 1 Crosspoint Tandem-Trunks, and their Maintenance Facilities" by S. H. Fuchs, et al, GTE Automatic Electric Technical Journal, Jul. 1972, pp. 131-136.

Primary Examiner—Stafford D. Schreyer
Attorney, Agent, or Firm—James W. Falk

[57] ABSTRACT

In a digital signal cross-connection system, the functions of the cross-connection of equipments and the access to those equipments for testing purposes are separated. The jacksets utilized for testing access are removed from the cross-connection bays and are considerably fewer in number than the terminations on the cross-connection bays. A concentrator switch is interposed between the jacksets and the cross-connection bays so that access is provided to the transmit and receive leads to the cross-connection bays only on an as needed basis, the concentrator switch also providing a control function for disconnecting the digital equipments from the cross-connection bays.

1 Claim, 2 Drawing Figures

DIGITAL SIGNAL CROSS-CONNECTION SYSTEM

FIELD OF THE INVENTION

This invention relates to cross-connection arrangements for telephone systems and more particularly to digital signal cross-connection frames providing for both interconnection of digital equipments and access to testing facilities for such equipments.

BACKGROUND OF THE INVENTION

Digital signal cross-connection bays or equipments in use today are generally manually operated interconnection systems. Hardware comprises a relay rack with mounted panels equipped with jacks, and mounting bars or panels arranged with terminal strips. It is a common point within a central office at which digital signal equipments are cross-connected to establish telecommunication circuits and where the digital equipment is monitored and temporarily patched for maintenance purposes. Circuit testing, patching, and rearranging are functions performed at the digital signal cross-connection bays.

Cross-connections are typically run on the rear of the digital signal cross-connection bays. The physical configuration of terminals (wiring lugs) and jumper pathways used in existing digital signal cross-connection designs is not conducive to efficient and accurate wiring. Narrow aisles with insufficient lighting compound the operations difficulties. As the digital signal cross-connection frame increases in size (number of bays), the quantity of jumpers placed increases to a point where the capacity of the jumper pathways is often beyond design limits. The resulting jumper congestion adds to the inefficiency of the jumper running operation.

When maintenance or testing is required on a digital circuit the signals are accessed at the front of the digital cross-connection bay by means of jacks. These jacks are grouped in sets, one per system, and wired to permit the signal to be monitored or patched (using plugin cords) as needed. Every equipment termination at the digital cross-connection equipment is provided with a set of jacks. Human factors limit the amount of miniaturization possible so that jacks occupy a significant amount of space.

The digital signal cross-connection bays required in large installations often exceed that which can be placed in a single continuous aisle. When more than one lineup of digital signal cross-connection equipment is required, electrical access between the aisles is provided by tie cables. For a variety of reasons it is often necessary to locate the digital signal cross-connection equipment line-ups at a considerable distance from each other. When this occurs the tie pairs require gain devices and jacks on both of the digital cross-connection aisles to be served. This arrangement is costly, difficult to install, difficult to maintain, and contributes significantly to the digital signal cross-connection congestion.

There have also been proposals in the art fully to automate the cross-connection and testing functions. However, this can be very expensive considering the large cross-connection installations that are encountered in the field.

SUMMARY OF THE INVENTION

In accordance with aspects of my invention, cross-connection systems are improved by separating the physical cross-connection function from the testing function also associated with the cross-connection equipment. Specifically, I provide that a distributing frame be employed for the cross-connections themselves, whereby the requisite jumpers may be manually placed in appropriate shelves or troughs, as is known in the art. These jumpers will generally remain undisturbed for relatively long periods of time and when placements, removals, or rearrangements are required, it is normally on a scheduled or planned basis so that immediate alteration of the jumpers or cross-connections is not essential. Further, distributing frames have developed over the years into system that optimize the cross-connection function, allowing high density terminations without introducing jumper congestion.

However, the testing functions are removed from the cross-connection frames themselves and may in fact be located at a remote location from the distributing frames. Specifically, a number of jack sets significantly smaller than the number of terminations on the distributing frame, as of the order of one-tenth the number, are connectable through a concentrator switch so that access is provided to the transmit and receive leads to the distribution frame, i.e., to the terminals, for the jack sets or access ports only on an as needed basis.

This arrangement has several beneficial results. It allows for remote operation, as for unattended offices, for the testing operations. It allows for rapid access to the cross-connection equipment for test purposes while significantly reducing the cost over an all automatic cross-connection system by sharing of the automatic equipment or concentrator switch. By removing the test jacks from the cross-connection equipment, it also significantly reduces the human activity at the cross-connection frames or bays themselves, thereby reducing the introduction of faults in the cross-connections or jumpers.

DETAILED DESCRIPTION

Figure 1:
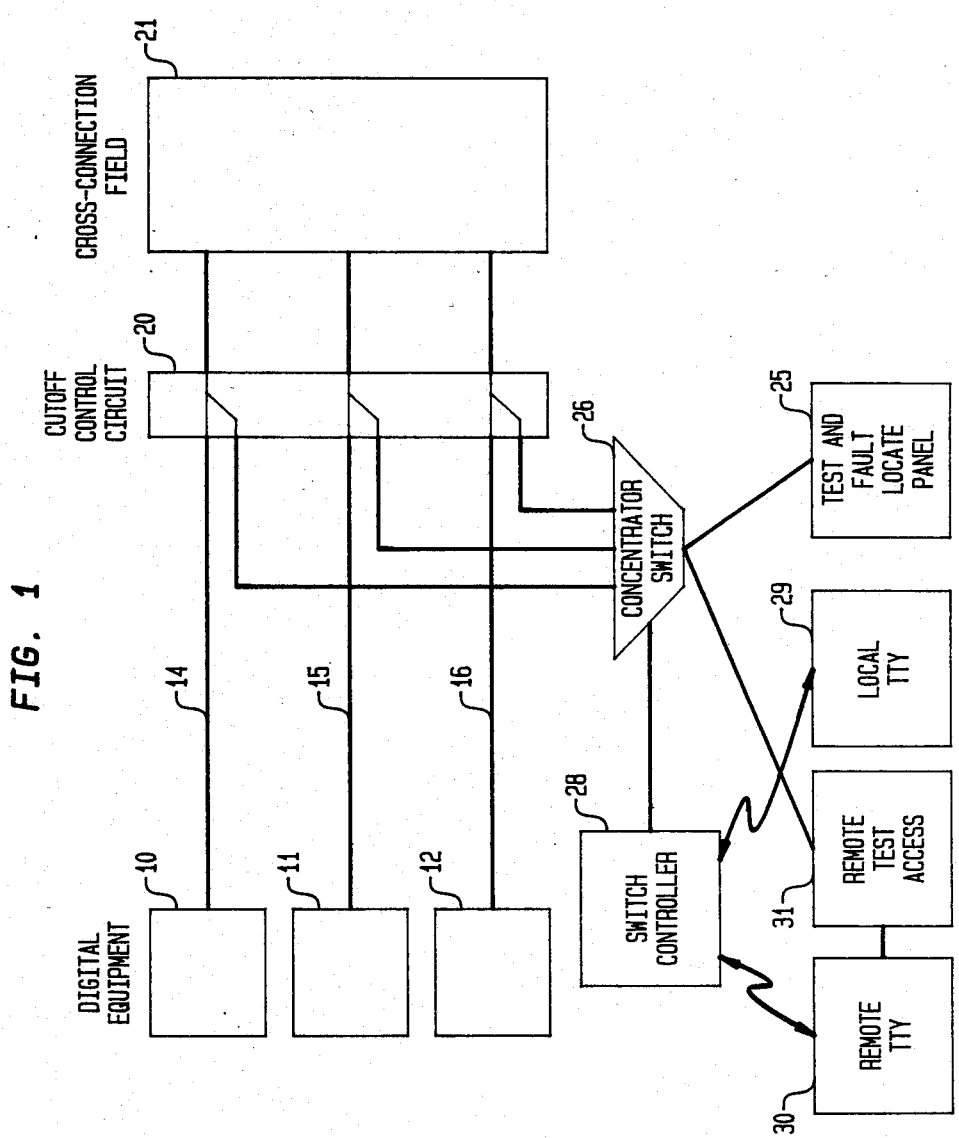
FIG. 1 is a block diagram representation of a digital signal cross-connection system in accordance with one embodiment of my invention.

Turning now to FIG. 1, various digital signal equipments 10, 11, 12, are connected over four wire conductors 14, 15, and 16, through a cutoff control circuit 20, described below with reference to FIG. 2, to the distributing frame or cross-connection bays 21. The digital equipments may comprise carrier systems, digital modems, digroup terminals, channel banks, and digital multiple-demultiplex equipment. Specifically, the digital cross-connection equipment in accordance with my invention may serve as the interconnection and test point facility for 1.544 Mb/s, 3.152 Mb/s, and 6.312 Mb/s signals.

The manual cross-connection field may comprise any of a number of known digital distribution frames, except that tracing lamp jumper wires need not be employed. However, in accordance with an aspect of my invention, test access is provided from a separate test and fault locate panel 25 that is cabled to the cross-connection field 21 through a concentrator switch 26 rather than being at the cross-connection field 21 itself.

The concentrator switch 26 may advantageously be a cross-bar switch for connecting the smaller number, such as 2000, jack positions or test ports of the panel 25 to the larger number, such as 20,000, terminals of the cross-connection bay 21. Obviously, electronic switches known in the art may also be employed. The concentrator switch 26 is also employed for connecting the digital equipment terminations at the cross-connection frame 21 to each other for patching operations. The switch accordingly should be of the type for interconnecting terminations at digital signal bit rates. One example of a switch that can be employed for the concentrator switch 26 is the first stage of a No. 5 Cross-Bar Switch produced by AT&T Technologies.

Concentrator switch 26 is controlled by a switch controller 28 which directs the connections to be made within the switch 26. It in turn is operated from a teletypewriter terminal input 29. The switch controller 28 may advantageously comprise a microprocessor having output driver interface equipment for operating the crossbar controls of the switch 26. Advantageously the microprocessor switch controller 28 includes a backup memory of the switch status and it may also provide interfaces to operations support systems and alarm and surveillance equipment, not shown.

As indicated, the teletypewriter terminal 29 and the test panel 25 may be located adjacent to the switch controller 28 and concentrator switch 26. However, as also indicated, the connections to the switch 26 and switch controller 28 may alternatively be made from a remote teletypewriter terminals 30 and a remote test access panel 31. Accordingly, in an office which is only attended a part of the time, the digital signal cross-connection system in accordance with my invention can be controlled locally when the office is attended or remotely when the office is not attended.

Figure 2:
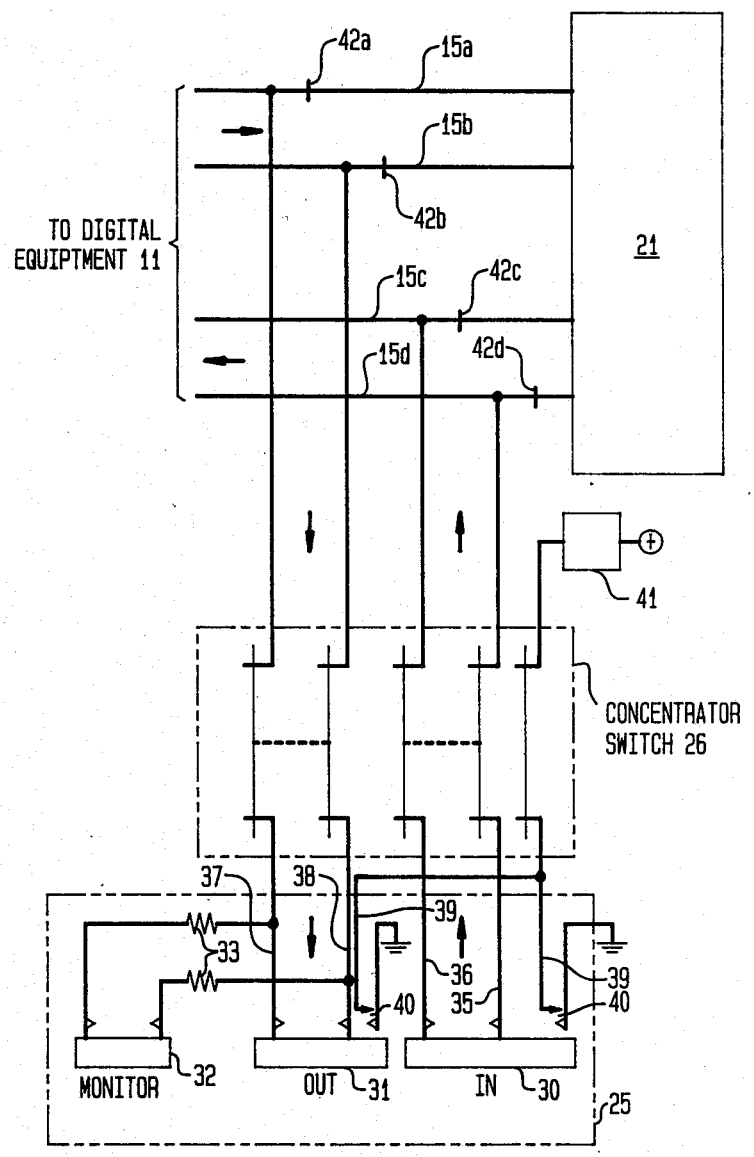
FIG. 2 is a partial schematic representation illustrating operation of the control relay through the concentrator switch in the embodiment of FIG. 1.

Turning now to FIG. 2, there is depicted a schematic representation of the connection of the test access ports of the test panel 25 to one of the four wire conductors 15 through the concentrator switch 26. Specifically, as depicted the access test ports comprise an In jack 30, an Out jack 31 and a Monitor jack 32. Extending from the access ports are five wires, wires 35 and 36 extending from the In port or jackset 30, wires 37 and 38 extending from the Out port or jackset 31 and through resistors 33 also from the Monitor port or jackset 32, and wire 39 which is a sleeve or ground lead, closed by contacts 40 on insertion of a jack plug into either the In or Out port for operating a relay 41 whose contacts 42a, 42b, 42c, and 42d comprise the cutoff circuit 20 and interrupt the connection of the leads 15a, 15b, 15c, and 15d respectively to the cross-connection bays 21.

Accordingly, the concentrator switch 26 operates to connect the five leads from the access ports leads 35, 36, 37, and 38 being connected respectively through to conductors 15d, 15c, 15b, and 15a, respectively, and lead 39 to the relay 41. As is known with such test ports, the In port 30 provides test access to the digital transmission equipment on the receive side of the transmission path (cross-connection equipment to digital transmission equipment); the Out port 31 provides test access on the digital transmission equipment transmit side of the transmission path (digital transmission equipment to the cross-connection equipment); and the Monitor port provides bridged access to this transmit side of the transmission path. The test access ports are electrically and physically equivalent to test access ports in prior cross-connection equipments once the transmission path is switched to the test panel through the concentrator switch 26 but, in accordance with my invention, are not part of the cross-connection equipment and may be physically remote therefrom.

By concentrating signal access from a smaller number of access ports, with the patching function also removed from the cross-connection field, the cross-connection bays themselves may be optimized for the unique functions of equipment cable and cross-connection jumper wiring. Another advantage of removing the signal access from the cross-connection field is that signal interruption due to craft activity is significantly lessened. Further, because of the use of the concentrator switch 26 a smaller number of access ports on the access panel 25 permits well designed labeling and layout schemes on the access panel 25, thereby reducing human errors.

If desired, the remote test access panel 31 in FIG. 1 allows for remote control of the patching, loopback, monitoring, and test access operations, thereby reducing time required for maintenance operations, particularly reducing craft travel time to unattended wire centers.

What is claimed is:

1. A digital signal cross-connection bay comprising jumpers for manually interconnecting terminals connectable to distinct digital equipments, a plurality of test access ports, said test access ports including test jack positions; and means for connecting said test positions to said bay terminals, characterized in that said connecting means comprises a concentrator switch interposed between said digital cross-connection bay terminals and said test access ports, the number of said test access ports being less than the number of said digital cross-connection bay terminals, and electronic means for automatically operating said concentrator switch to connect a distinct one of said test access ports to the digital equipment normally connectable to a distinct one of said cross-connection bay terminals.

* * * * *